US006883891B2

(12) United States Patent
Nojima

(10) Patent No.: US 6,883,891 B2
(45) Date of Patent: Apr. 26, 2005

(54) METHOD FOR PRODUCING SCALE FOR DETECTING CONVEYANCE ROTATION ANGLE OF CONVEYING ROLLER AND RECORDING APPARATUS USING THE SCALE

(75) Inventor: Takashi Nojima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/885,013

(22) Filed: Jun. 21, 2001

(65) Prior Publication Data

US 2001/0055040 A1 Dec. 27, 2001

(30) Foreign Application Priority Data

Jun. 23, 2000 (JP) ....................................... 2000-189419

(51) Int. Cl.$^{7}$ ......................... B41J 29/38; G01B 21/022
(52) U.S. Cl. ......................................................... 347/16
(58) Field of Search ....................... 347/2, 16; 400/582, 400/545; 399/78

(56) References Cited

U.S. PATENT DOCUMENTS 4,673,303 A * 6/1987 Sansone et al. ............. 347/103
5,021,809 A * 6/1991 Abe et al. ...................... 347/44
5,450,106 A * 9/1995 Morioka et al. .............. 347/37
5,678,144 A * 10/1997 Osaki et al. ................ 399/167
6,189,990 B1 * 2/2001 Youn ............................. 347/8

* cited by examiner

*Primary Examiner*—Thinh Nguyen
*Assistant Examiner*—Julian D. Huffman
(74) *Attorney, Agent, or Firm*—Fitzpatrick, Cella, Harper & Scinto

(57) ABSTRACT

Disclosed is a method for producing a scale for detecting conveyance rotation angle of a conveying roller, wherein the part tolerances of an encoder for use in the conveying roller, the offset at the time of assembly, etc. are canceled to thereby perform high accuracy detection. The conveyance outer peripheral portion of the conveying roller is chucked (held), and the conveying roller is rotated by a motor. The rotation angle is detected by a reference encoder, and rotation angle allotment is effected through magnetization on the basis of the output of the reference encoder to arrange N- and S-poles by varying current direction of a magnetizing head.

10 Claims, 11 Drawing Sheets

1
2b
11
2k
2c
10
4
CENTER OF ROTATION
N
S

METHOD FOR PRODUCING SCALE FOR DETECTING CONVEYANCE ROTATION ANGLE OF CONVEYING ROLLER AND RECORDING APPARATUS USING THE SCALE

BACKGROUND OF THE INVENTION

1. Field of the Invention

The present invention relates to the detection of a rotation angle of a conveying roller in a recording apparatus.

2. Related Background Art

Generally speaking, recording apparatuses, such as printers, copying machines, and facsimile apparatuses, record an image consisting of a dot pattern on a recording sheet, such as a paper sheet or a thin plastic plate, by driving an energy generator of a recording head in accordance with image information.

Such recording apparatuses can be classified, in terms of recording system, into ink-jet type apparatuses, wire-dot type apparatuses, thermal type apparatuses, laser-beam type apparatuses, etc. Of these, in the ink-jet type recording apparatuses, recording is effected by discharging droplets of ink (recording liquid) from discharge holes of a recording head and causing them to adhere to a recording sheet.

Further, in terms of recording mechanism construction, such apparatuses can be classified into full-line type and serial type apparatuses. A full-line type apparatus has a recording means comprising recording elements arranged over the entire recording width range extending perpendicular to the recording sheet conveying direction, recording being performed by moving the recording sheet in the sub scanning direction (the recording sheet conveying direction). In a serial type apparatus, recording is effected by performing scanning with a recording means mounted on a carriage movable in the main scanning direction and moving the recording sheet in the sub scanning direction. In particular, the serial type apparatus, which needs no such wide recording means as used in the full-line type apparatus, is relatively inexpensive and is now in widespread use.

Conventionally, an open loop control system using a stepping motor has been mainly adopted in the means for moving the recording sheet in the sub scanning direction, i.e., the so-called sheet conveying means. Recently, however, there is an increasing demand for high image quality, and it is rather difficult to meet this demand with the open loop control system. In view of this, adoption of a feedback control system is required in which, to effect high-quality conveyance control, the rotation angle of the conveying roller when conveying the recording sheet is detected to control the rotation of the conveying roller, etc.

However, while it is desirable that an encoder wheel on which a scale is written (formed) in advance be mounted to the conveying roller such that their centers of rotation (axes) coincide with each other, generation of offset between the center of rotation of the conveyance outer peripheral portion of the conveying roller and the center of rotation of the detecting portion of the encoder wheel cannot be avoided because of the play between the mounting holes and the encoder wheel, etc.

SUMMARY OF THE INVENTION

The present invention has been made with a view toward solving the above problem in the prior art. It is accordingly an object of the present invention to provide a method for producing a scale for detecting the conveyance rotation angle of a conveying roller in which it is possible to cancel the part tolerances of an encoder for use in the conveying roller, the offset at the time of assembly thereof, etc., and a recording apparatus using the scale thus produced.

Another object of the present invention is to provide a method for producing a scale provided coaxially with a conveying roller and adapted to detect conveyance rotation angle, wherein a recording medium conveyance outer peripheral portion of the conveying roller is held, and wherein rotation angle allotment is effected on the conveying roller to thereby form a scale for detecting conveyance rotation angle.

Still another object of the present invention is to provide a recording apparatus comprising a conveying means including a conveying roller having a scale for detecting conveyance rotation angle formed by holding a recording medium conveyance outer peripheral portion of the conveying roller and effecting rotation angle allotment on the conveying roller and a pinch roller in press contact with the conveying roller, and a detecting means for detecting a conveyance rotation angle of the conveying roller, wherein recording is effected by a recording means on a sheet conveyed by the conveying means.

DETAILED DESCRIPTION OF THE PREFERRED EMBODIMENTS

In the following, an ink-jet recording apparatus according to an embodiment of the present invention will be described along with various further embodiments.

First Embodiment

Figure 1:
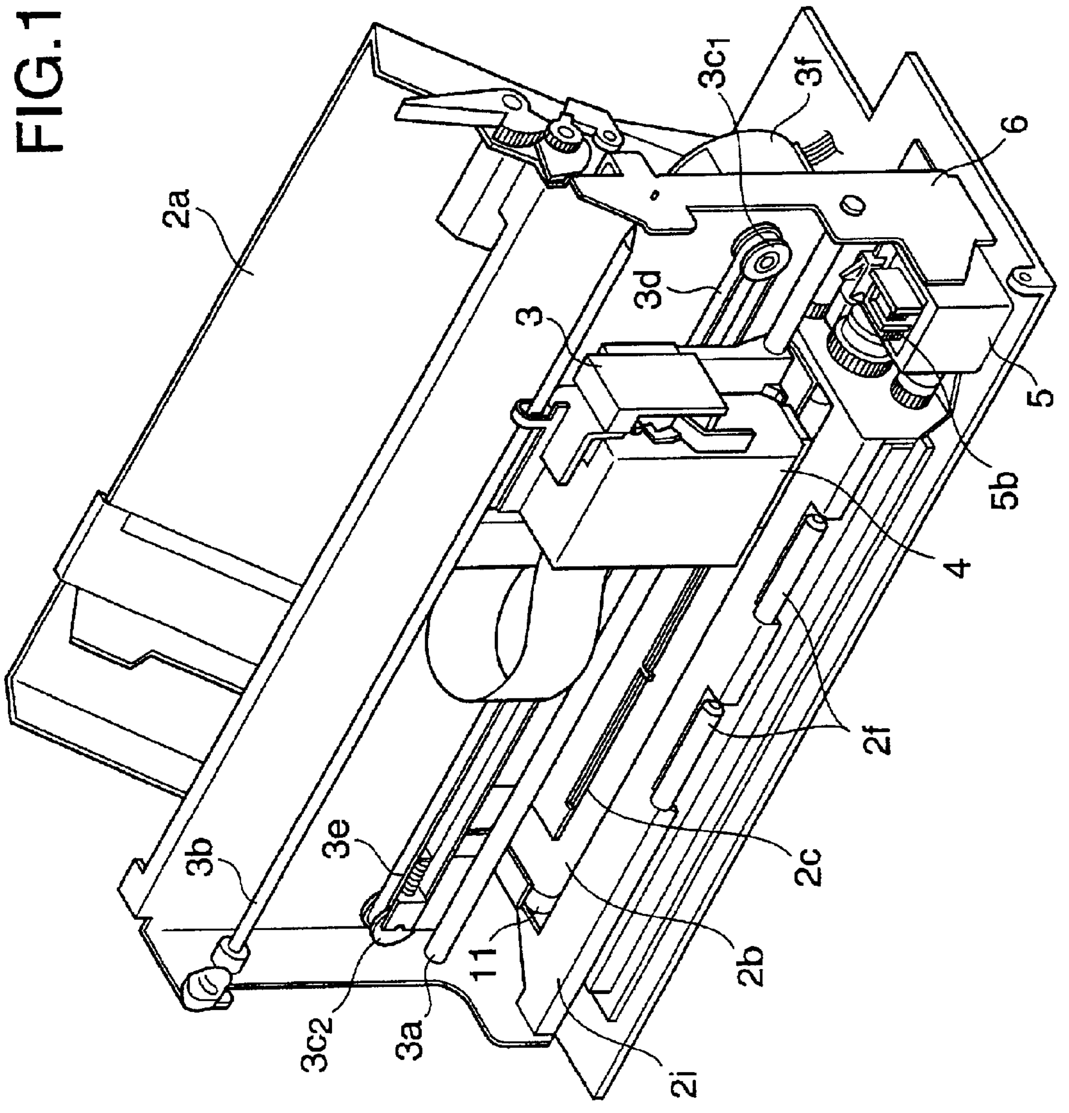
FIG. 1 is a perspective view illustrating an ink-jet recording apparatus according to a first embodiment of the present invention.
Figure 2:
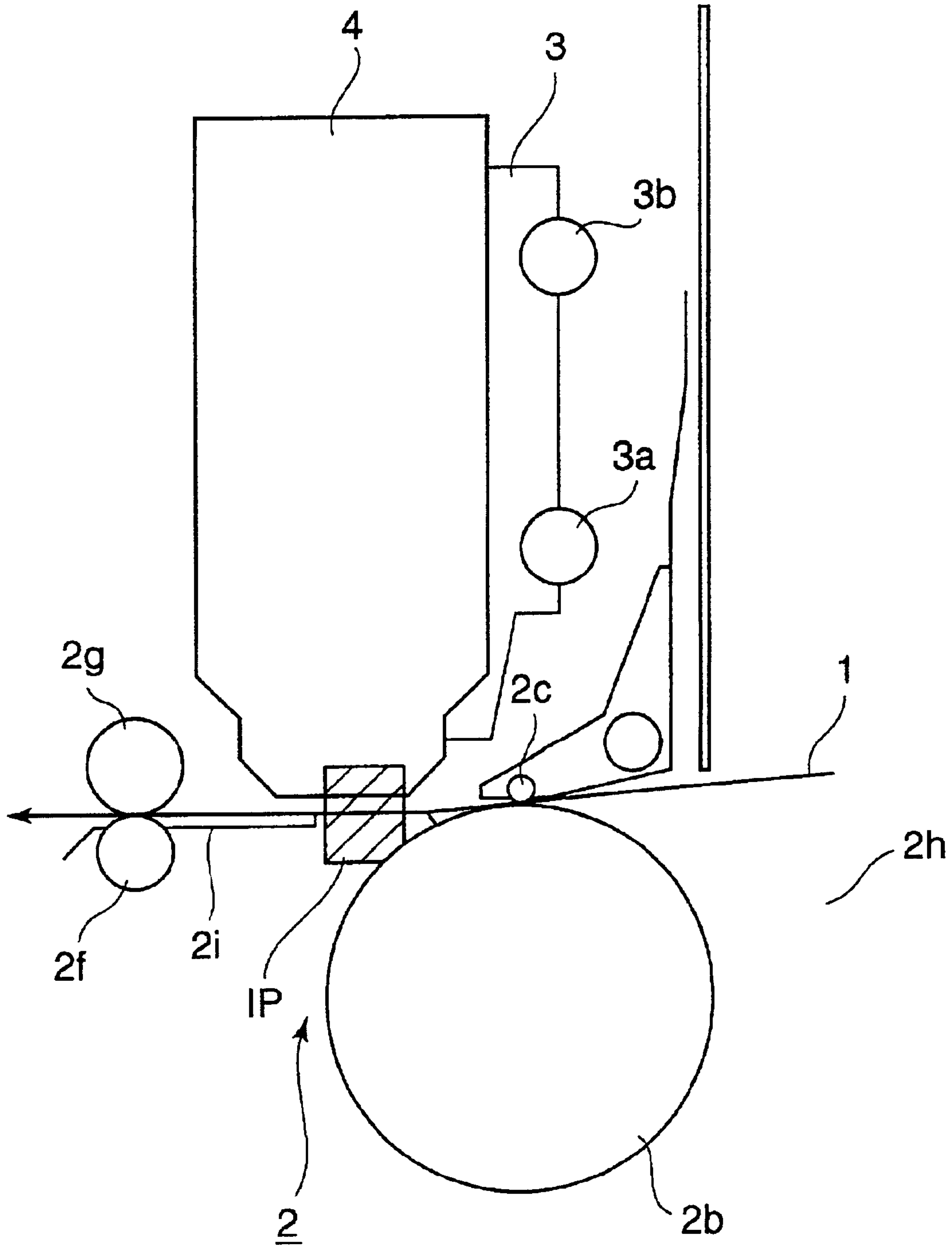
FIG. 2 is a schematic sectional view of the apparatus of FIG. 1.

First, an ink-jet recording apparatus according to an embodiment of the present invention will be described with reference to the drawings. FIG. 1 is a perspective view illustrating the ink-jet recording apparatus, and FIG. 2 is a schematic sectional view of the apparatus.

(Illustration of the General Construction)

The general construction of the apparatus will be described. In this apparatus, a recording medium (paper, cloth, OHP sheet or the like) 1 is conveyed by a conveying means 2. A recording head 4 mounted on a carriage 3 is reciprocated with respect to the recording medium 1, and ink is discharged in accordance with an image signal, thereby performing recording. After the recording, the recording medium 1 is discharged onto a predetermined discharge portion. On the other hand, the ink discharge performance of the recording head 4 is maintained or recovered by a recovery mechanism 5. The above-mentioned components will now be described one by one.

Conveying Means

The conveying means 2 conveys the recording medium 1 to a recording position IP, and, after the recording, discharges the recording medium 1 onto the discharge portion.

First, a plurality of recording mediums are loaded into an ASF (auto sheet feeder) 2*a* mounted to an apparatus main body 6. The ASF 2*a* has a sheet separating mechanism (not shown) which separates the plurality of loaded recording mediums one by one for conveyance. Each recording medium is nipped between a conveying roller 2*b* on the downstream side with respect to the conveying direction and a pinch roller 2*c* in press contact with the conveying roller 2*b* and driven to rotate. The conveying force is provided by driving and rotating the conveying roller 2*b* .

The conveying roller 2*b* may consist of a metal cylinder whose surface is coated with rubber to a thickness of not larger than 1 mm or a metal cylinder with a roughened surface. In some cases, ceramic particles or the like are added to the coating material to thereby enhance the conveying force that is to be imparted to the recording medium.

The control of the conveying roller 2*b* (referred to as "LF control") will be described below.

After the recording, the recording medium 1 is conveyed toward the discharge portion by discharge rollers 2*f* and a spur-like rotating member (driven discharge rotating member) 2*g* which is in press contact with the discharge rollers 2*f* and driven to rotate.

A platen 2*i* serving as a support member for supporting the back side of the recording medium 1 is provided so as to extend from the recording position where recording is performed by the recording head 4 to the downstream side with respect to the recording medium conveying direction.

(Carriage)

The carriage 3 serves to reciprocate the recording head 4. Two guide shafts 3*a* and 3*b* are provided so as to extend in a direction intersecting or perpendicular to the direction in which the recording medium 1 is conveyed. The carriage 3 is slidably mounted on these shafts 3*a* and 3*b*.

A driving pulley 3*c*1 and a driven pulley 3*c*2 are mounted near the ends of the guide shaft 3*a*, and a timing belt 3*d* engaged with the carriage 3 runs around the pulleys 3*c*1 and 3*c*2 and is stretched by a tension spring 3*e*.

Further, a carriage motor 3*f* is connected to the driving pulley 3*c*, and normal and reverse rotation of this motor 3*f* causes the carriage 3 to reciprocate on the guide shafts 3*a* and 3*b*.

(Recording Head)

The recording head 4 records an image by discharging ink onto the recording medium 1 conveyed by the conveying means 2. In this apparatus, an ink-jet type recording head, which performs recording by discharging ink droplets, is adopted. That is, the recording head 4 comprises minute liquid discharge holes (orifices), liquid passages, energy acting portions respectively provided in a part of each liquid passage, and an energy generating means for generating liquid-droplet-forming energy which acts on the liquid in the energy acting portion of each liquid passage.

Examples of the recording methods utilizing energy generating means for generating such energy include a recording method using an electromechanical converter, such as a piezoelectric element, a recording method using an energy generating means which generates heat through application of an electromagnetic wave of a laser or the like and which causes liquid droplets to be discharged by the action due to the heat generation, and a recording method using an energy generating means which heats a liquid by an electrothermal converter, such as a heat generating element having a heat generating resistor, to cause liquid to be discharged.

In particular, the recording head used in the ink-jet recording method in which liquid is discharged by heat energy allows liquid discharge holes (orifices) for discharging recording liquid to form discharge droplets to be arranged at high density, so that it is capable of performing high resolution recording. In particular, the recording head using an electrothermal converter as the energy generating means is advantageous in that it can be easily reduced in size, that it can sufficiently utilize the advantages of the IC technology and the microprocessing technology, which have recently advanced and been improved remarkably in the field of semiconductor technology, that it easily allows high density mounting, and that it can be produced at low cost.

(Recovery Mechanism)

The recovery mechanism 5 prevents clogging, etc. of the recording head 4 after recording. Numeral 5*b* indicates a capping mechanism for preventing defective ink discharge of the recording head 4. It has an elastic cap formed of rubber or the like, which is brought into press contact with the surface of the recording head 4 where the ink discharge holes are arranged, or covers at least the ink discharge holes to thereby prevent water evaporation, etc. through the discharge holes. Further, after capping, the capping mechanism 5*b* creates a negative pressure in the cap by a pump or the like and draws out the viscous ink from the ink discharge holes to thereby achieve a satisfactory ink discharge.

(LF Control Construction)

Figure 5:
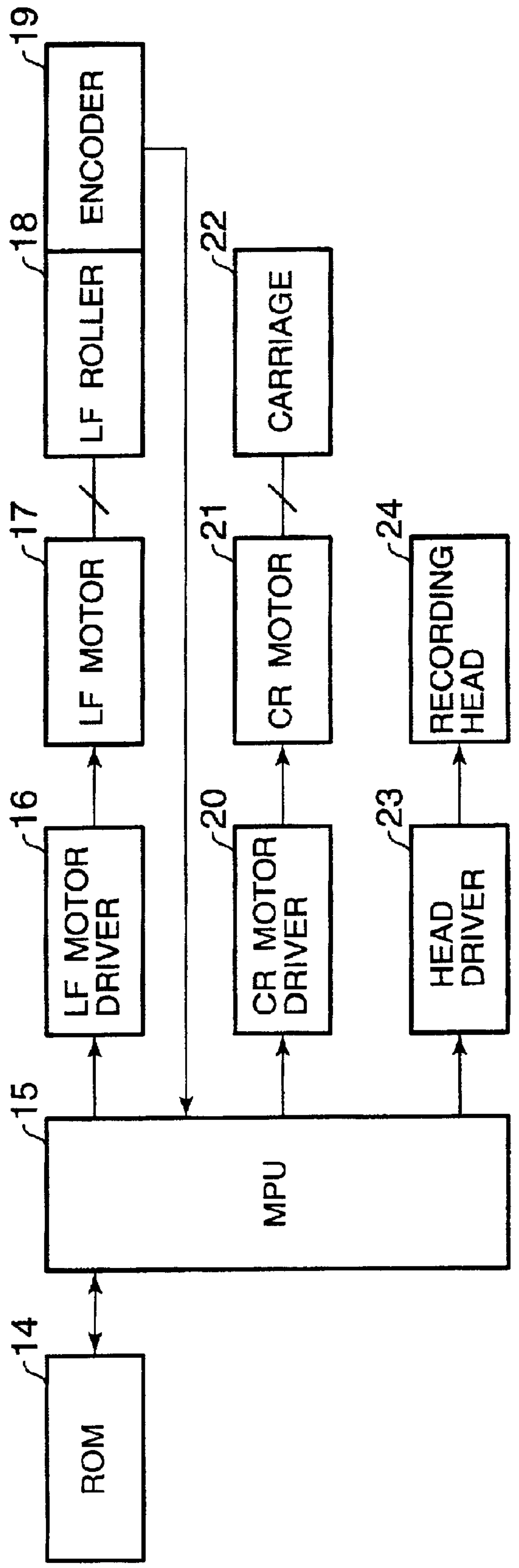
FIG. 5 is a control block diagram of the recording apparatus of this embodiment.

FIG. 5 is a control block diagram of a recording apparatus. In the diagram, what is not directly pertinent to the present invention is omitted. In the drawing, numeral 15 indicates an MPU, which controls the recording apparatus by a program stored in the ROM 14.

Connected to the MPU 15 are a recording head driver 23 for driving a recording head 24, a CR motor driver 20 for driving a CR motor 21 connected to a carriage 22, etc.

In LF driving, feedback control is effected. The conveyance rotation angle of an LF roller 18 driven by an LF motor driver 16 and an LF motor 17 is detected by an encoder 19, and fed back to the MPU 15 to control the rotation angle and rotating speed of the LF roller 18.

In the following, the encoder portion of this embodiment will be described in detail. In this embodiment, a magnetic detector element and a magnetic wheel are used in the encoder 19.

Figure 3:
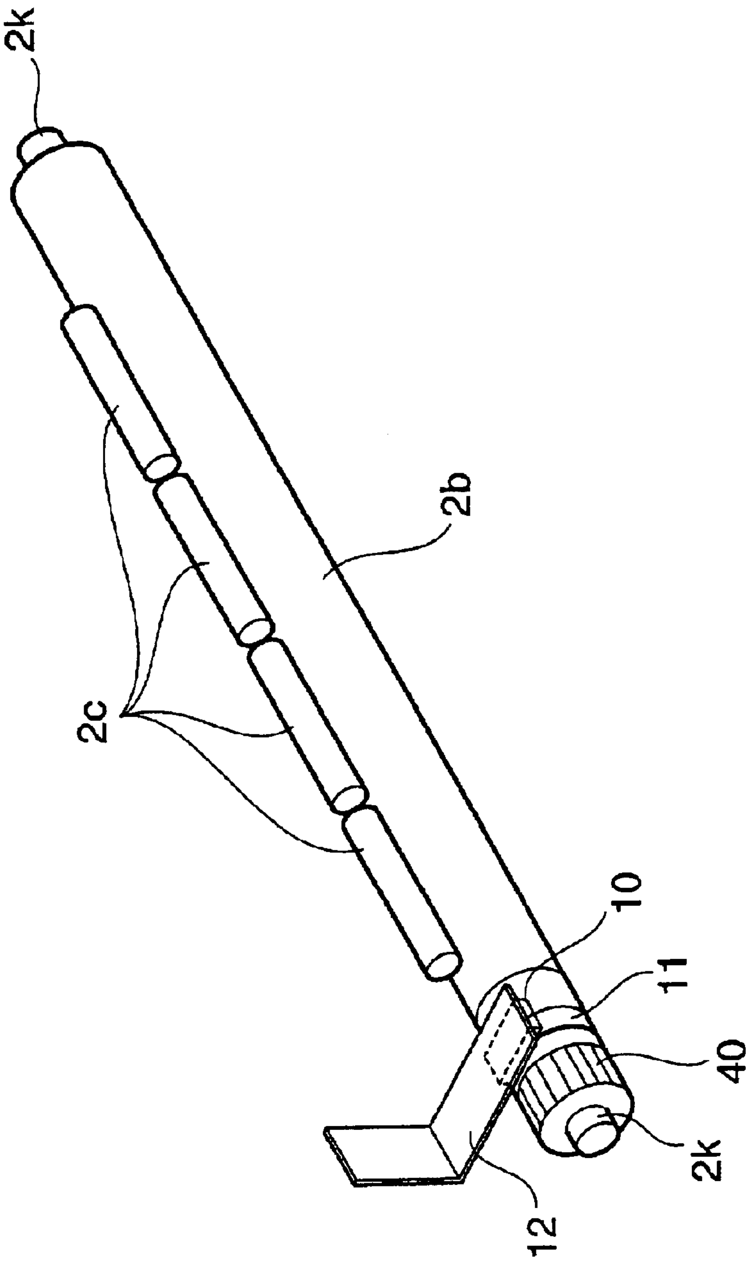
FIG. 3 is a detailed view showing the construction of a means for detecting a conveyance rotation angle of a conveying roller for use in conveyance control of the recording apparatus of this embodiment.
Figure 4:
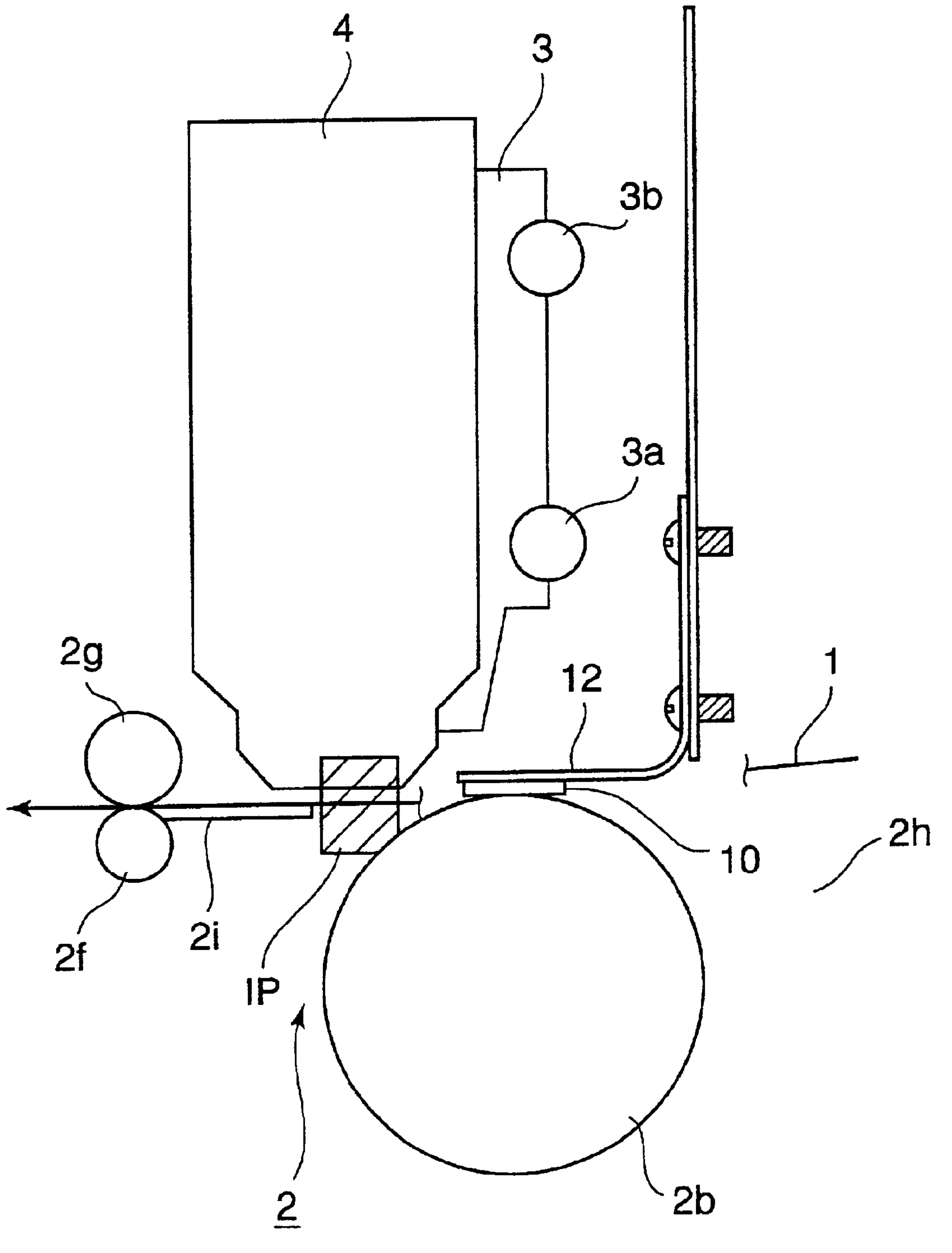
FIG. 4 is a sectional view of a main portion of the means for detecting the conveyance rotation angle of the conveying roller for use in conveyance control of the recording apparatus of this embodiment.

FIGS. 3 and 4 are detailed views showing only the portion related to the LF control of the conveying means 2.

A magnetic wheel 11 is integrally mounted to the conveying roller 2*b*. Written to the outer periphery of the magnetic wheel 11 is a scale formed through magnetization to arrange N- and S-poles alternately at a minute pitch.

As the magnetic detector element 10, an MR sensor whose resistance is varied by magnetic force is used. When the conveying roller 2*b* rotates, the magnetic wheel 11 rotates and the magnetic line of force passing through the magnetic detector element 10 varies, so that it is possible to detect the rotation.

Figures 6A, 6B, 6C, 6D:
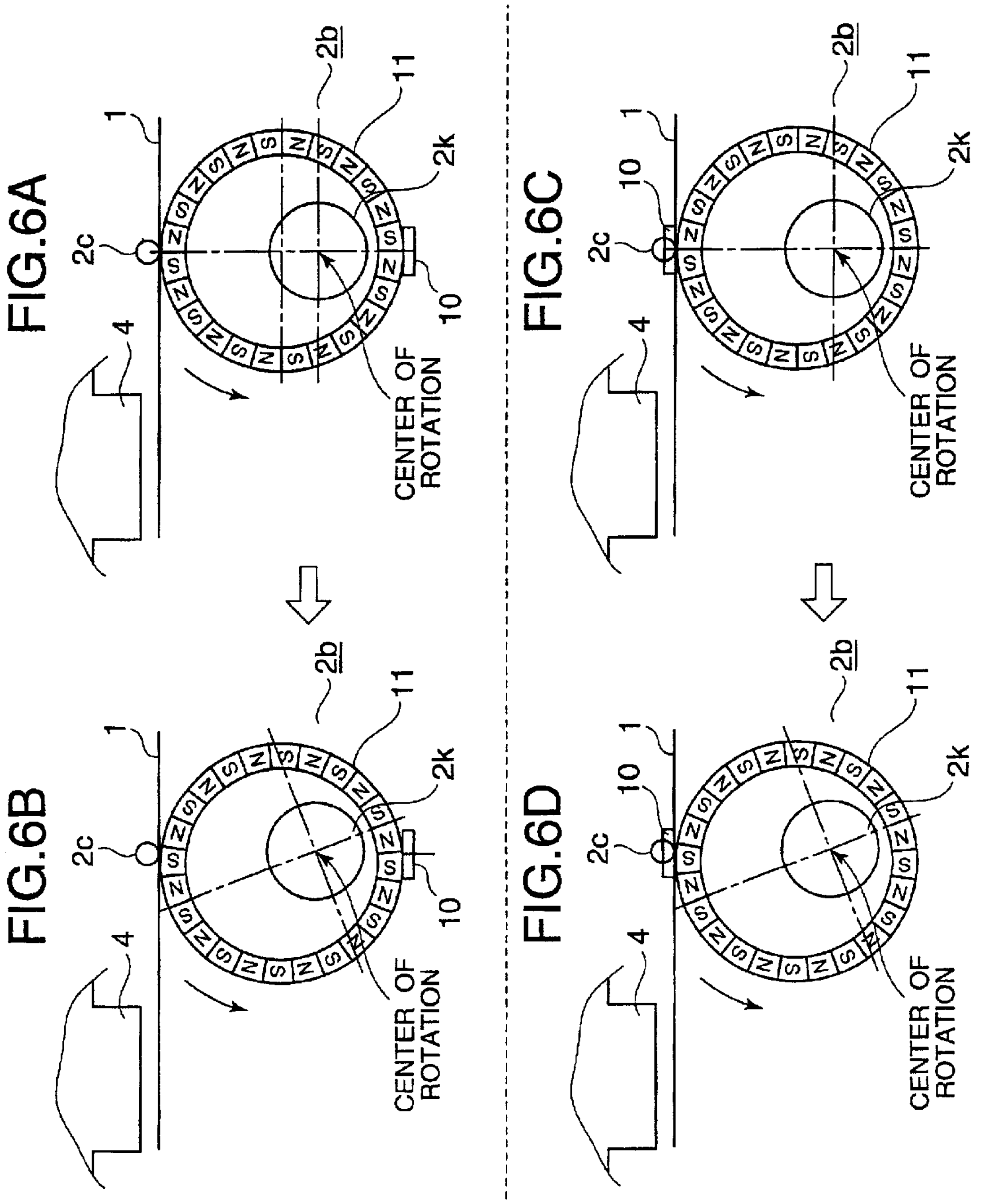
FIGS. 6A, 6B, 6C and 6D are explanatory diagrams illustrating the mounting of a conveyance rotation angle detecting element for the conveying roller of this embodiment.

The magnetic detector element 10 is mounted at a position of the same phase as the pinch rollers 2*c* with respect to the axis of the conveyance peripheral surface portion of the conveying roller 2*b* (See FIGS. 6C and 6D). This is for the purpose of canceling the effect of the offset when the conveying roller 2*b* is supported in the recording apparatus main body by means of a rotation shaft 2*k*.

This will be described in more detail with reference to FIGS. 6A through 6D.

Because of the reduction in torque due to friction, the conveying roller 2*b* has the rotation shaft 2*k* whose diameter is smaller than that of the conveying portion. However, in most cases, offset is generated between the axis of the conveyance outer peripheral portion of the conveying roller 2*b* and the rotation shaft 2*k*.

When the rotation shaft 2*k* is mounted to a bearing (not shown) of the recording apparatus, the center of rotation of the conveying roller 2*b* is the center of the rotation shaft 2*k*. That is, the conveyance outer peripheral portion of the conveying roller 2*b* rotates in an offset state.

FIGS. 6A and 6B show a case in which the phase of the magnetic detector element 10 is shifted by 180 degrees from that of the pinch rollers 2*c* with respect to the axis of the conveyance outer peripheral portion of the conveying roller 2*b*. Starting from the state of FIG. 6A, the conveying roller 2*b* is rotated until the magnetic detector element 10 detects one pulse. In the state shown in FIG. 6B, the magnetic detector element 10 has detected one pulse. It is to be noted, however, that, in this state, the position of the pinch rollers 2*c*, i.e., the distance by which the recording medium 1 has advanced corresponds to 1.8 pulses. In this way, when the magnetic detector element 10 is arranged at this position, the distance by which the recording medium 1 advances may not be fed back accurately.

On the other hand, FIGS. 6C and 6D show a case in which the magnetic detector element 10 is installed at a position of the same phase as the pinch rollers 2*c* with respect to the conveying roller 2*b*. Starting from the state of FIG. 6C, the conveying roller 2*b* is rotated until the magnetic detector element 10 detects one pulse. In the state shown in FIG. 6D, the magnetic detector element 10 has detected one pulse. The position of the pinch rollers 2*c*, that is, the distance by which the recording medium 1 has advanced, corresponds to one pulse. Thus, the conveying distance of the recording medium 1 is accurately detected.

Further, since accuracy in conveyance at the recording position IP is required, the magnetic detector element 10 must be secured in position so as to involve no positional deviation relative to the recording head 4 with respect to the recording medium conveying direction.

Further, for the magnetic detector element 10 to detect the magnetic force of the magnetic wheel 11, it is necessary to maintain the gap therebetween with an accuracy of not more than 100 $\mu$m. However, since it is difficult to maintain the gap in a non-contact state, a pressurizing force is provided by a plate spring 12 so that a protrusion (not shown) of the holder of the magnetic detector element 10 may be in contact with the magnetic wheel 11, thereby constantly maintaining a fixed gap.

The magnetic wheel 11 is realized in the form of a coating consisting of a ferromagnetic material, such as nickel or cobalt, or through injection molding of a material consisting of a resin kneaded with a ferrite powder or a rare earth metal magnet powder. Its surface is polished as needed and, in some cases, a uniform surface property is obtained by a secondary processing. The magnetic wheel 11 may be formed by directly performing processing on the conveying roller 2*b*. It is to be noted, however, that since the conveying roller 2*b* normally has a length of approximately 200 to 300 mm, a problem, such as a rather large mold size, is involved especially when performing insert molding, which is a kind of injection molding method. Thus, processing is easier to perform when the magnetic wheel portion and the conveying roller are separately prepared before being integrated with each other.

The magnetic wheel 11 integrated with the conveying roller is not magnetized yet, so that it is necessary to perform magnetization thereon by a magnetizing device.

Figure 7:
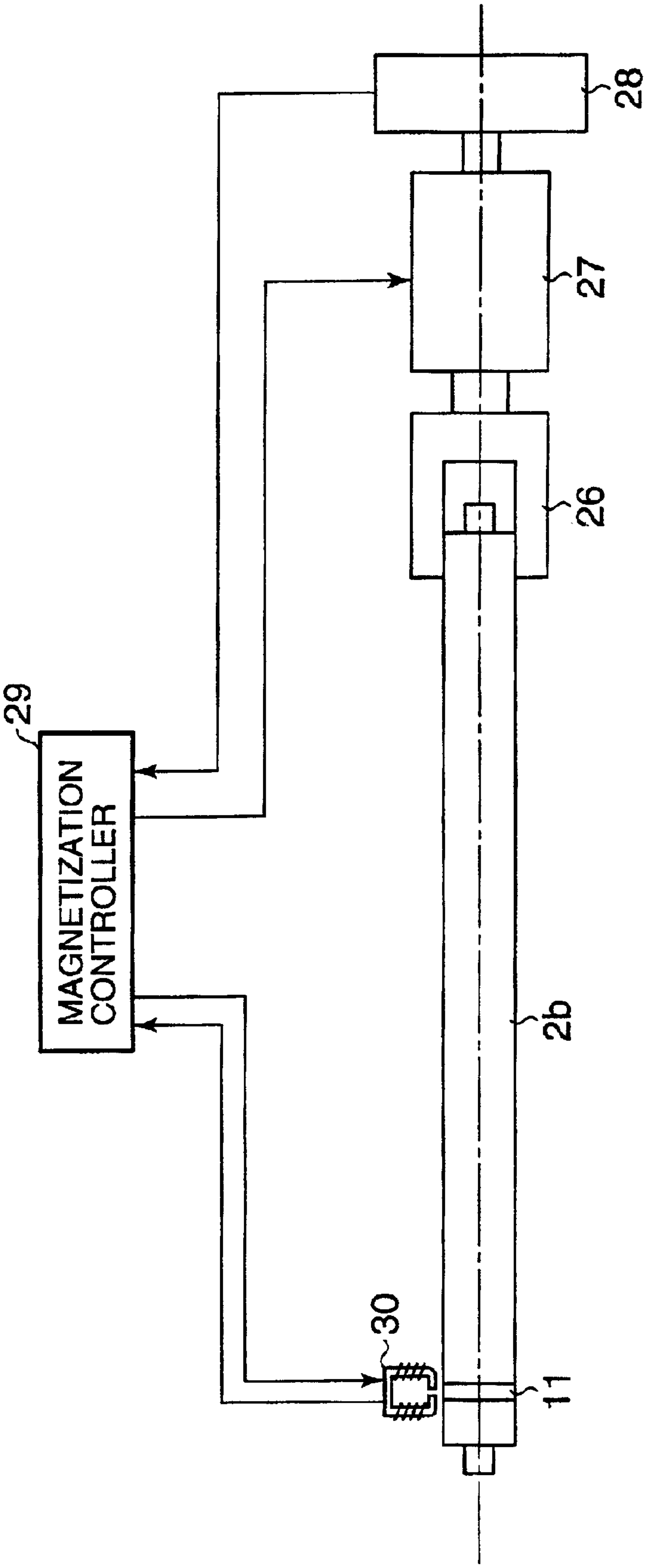
FIG. 7 is a block diagram illustrating a magnetizing device used in a scale producing method according to this embodiment.

FIG. 7 is a block diagram showing a magnetizing device. The conveyance outer peripheral portion of the conveying roller 2*b* is chucked (held) by a chuck 26, and the conveying roller 2*b* is rotated by a motor 27. The rotation angle is detected by a reference encoder 28, and, on the basis of the output of the reference encoder, rotation angle allotment is effected through variation of the direction of current in a magnetization head 30 to arrange N- and S-poles.

Thus, the conveyance outer peripheral portion is held by the chuck 26 and a predetermined rotation angle allotment is effected through magnetization, so that even if the magnetic wheel 11 is mounted in a state in which it is offset, for example, with respect to the conveyance outer peripheral portion, the angle allotment is effected through magnetization by using the conveyance outer peripheral portion as a reference after integrating the conveying roller 2*b* with the magnetic wheel 11. Thus, it is possible to detect the rotation angle of the conveyance outer peripheral surface, making it possible to perform accurate paper conveyance.

In FIG. 3, numeral 40 indicates a driving gear. Since the conveying roller 2*b* normally has a length of approximately 200 to 300 mm, the processing is easier when the driving gear 40 and the conveying roller 2*b* are prepared separately and then integrated with each other.

In this embodiment, the driving gear 40 and the magnetic wheel 11 are produced integrally and integrated with the conveying roller 2*b*, whereby it is possible to reduce the number of parts and achieve an improvement in terms of production handling. Thus, the driving gear 40 and the magnetic wheel 11 are provided on the surface of the same end portion of the conveying roller 2*b*.

The conveying roller 2*b* consists of a metal cylinder whose surface is coated with rubber mixed with ceramic particles. The error in the coating layer thickness is not more than 2 $\mu$m. Thus, if the coated material surface is chucked, avoiding the coating surface, the error is so minute as to involve no problem.

Second Embodiment

While in the above-described first embodiment an MR element is used for the magnetic detector element of the encoder portion, it is also possible to use an encoder portion based on a magneto-optical recording/detecting principle. This embodiment is of the same construction as the first embodiment except for what is described below.

In the magneto-optical recording system, a minute region of a magnetic layer is heated by light up to the Curie point, and in a state in which the coercive force of this region is extremely reduced, an external magnetic field is applied to thereby cause reversal of magnetizing direction to write (form) a scale.

By using this magneto-optical recording/detecting technique, reversal of magnetizing direction is effected for each specified angle of the conveying roller, and this reversal of magnetizing direction is read by the recording apparatus, whereby the rotation angle of the roller is detected. To perform the detection, a laser beam is applied to the magnetized surface, and when the laser beam is reflected by the surface of the magnetic layer, the difference in reflection of the deflection surface depending on magnetizing direction is utilized.

Figure 8:
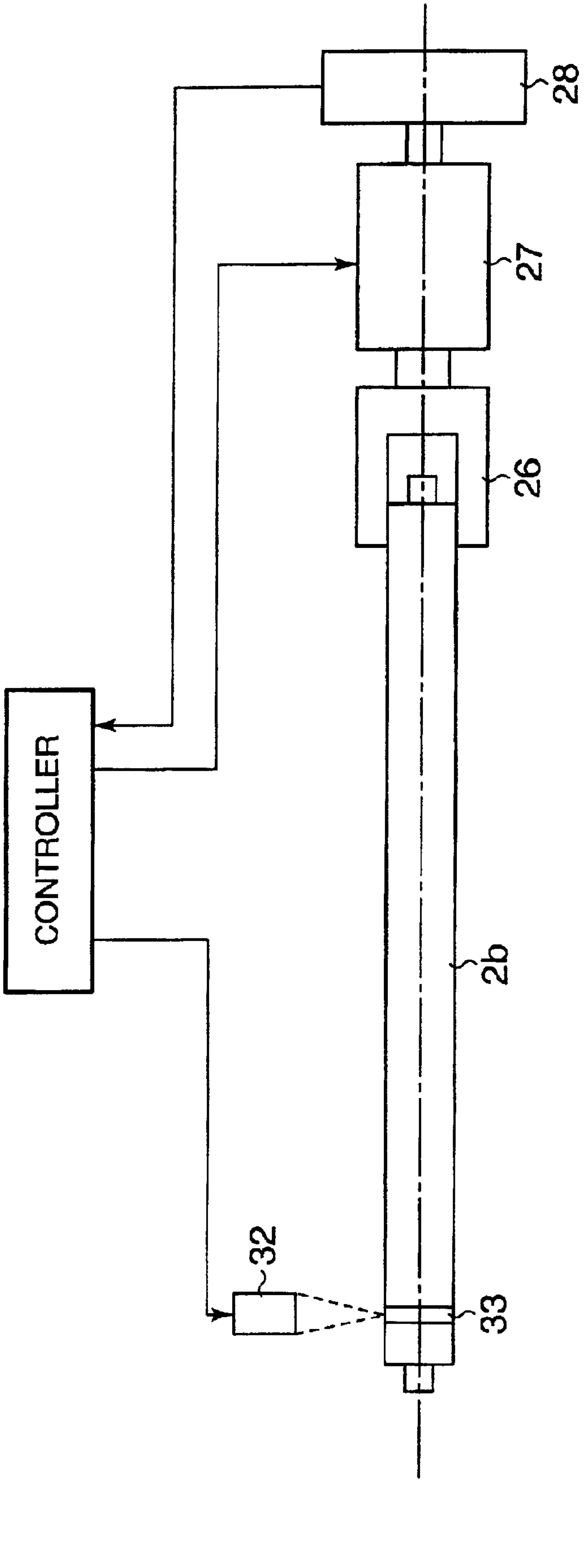
FIG. 8 is a block diagram illustrating a writing device used in a scale producing method according to a second embodiment of the present invention.

FIG. 8 is a block diagram showing a writing device according to this embodiment.

The conveyance outer peripheral portion of the conveying roller 2*b* on which a magnetic substance portion 33 is provided beforehand is chucked by the chuck 26, and the conveying roller 2*b* is rotated by a motor 27. And, the rotation angle of the conveying roller 2*b* is detected by a reference encoder 28, and, on the basis of the output of the reference encoder 28, rotation angle allotment is effected to arrange N- and S-poles through magnetization by varying the direction of the magnet of a magneto-optical head 32.

In this way, magnetization for angle allotment is effected, with the conveyance outer peripheral portion being chucked by the chuck 26, so that, if, for example, the magnetic substance portion 33 is offset with respect to the conveyance outer peripheral portion, magnetization for angle allotment is performed by using the conveyance outer peripheral portion as a reference after integrating the conveying roller 2*b* with the magnetic substance portion 33. Thus, the rotation angle of the conveyance outer peripheral portion can be detected, and it is possible to perform accurate paper conveyance.

Figure 9:
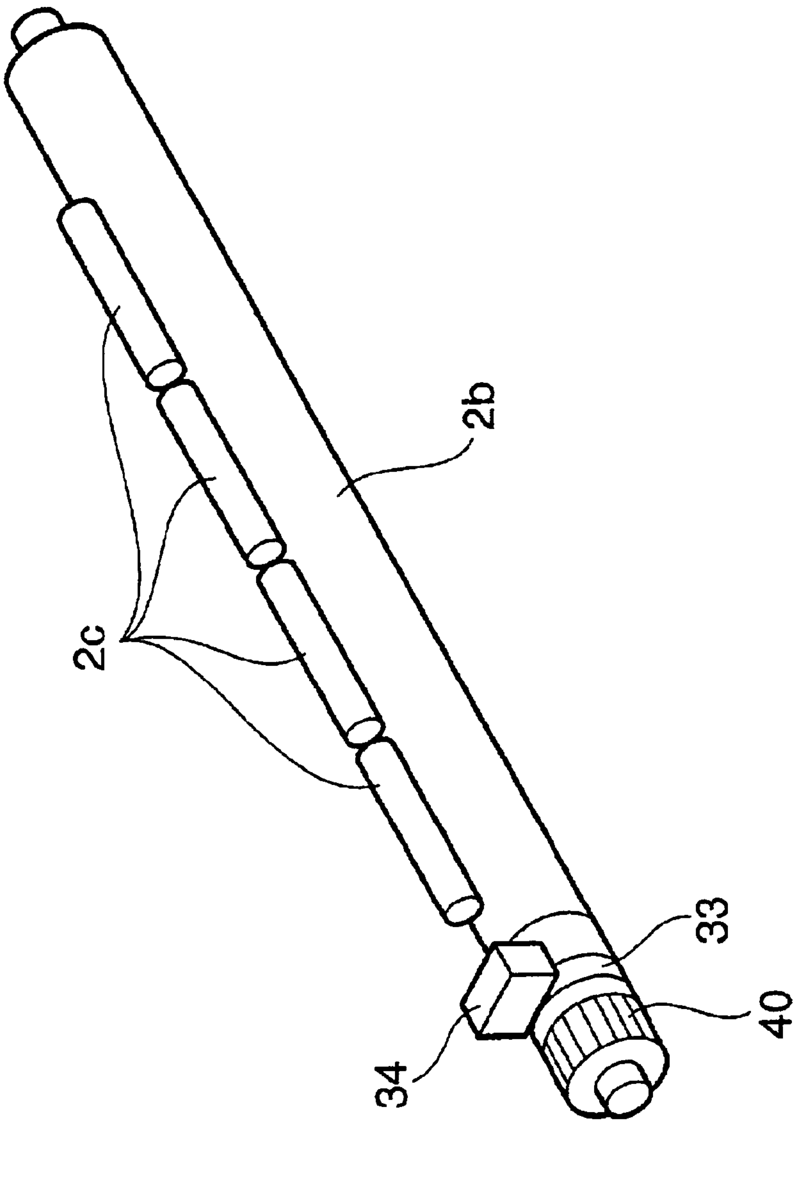
FIG. 9 is a sectional view of a main portion of a conveying roller angle detecting means for use in conveyance control of a recording apparatus according to the second embodiment.

FIG. 9 is a detailed view showing only the portion related to the LF control of this embodiment.

In the drawing, numeral 34 indicates a laser reading element. This element 34 detects that reflection of the laser beam on the surface of the magnetic substance portion 33 varies depending upon magnetizing direction to thereby detect the rotation of the LF roller 2*b*.

Third Embodiment

While the above-described second embodiment adopts an encoder portion to which the magneto-optical recording system is applied, it is also possible to adopt a method in which a high power laser capable of directly forming recesses in the surface of the conveying roller is used to provide recesses in the roller surface in accordance with rotation angle allotment based on the output of the reference encoder 28, and in which the recording apparatus detects the recesses in the roller surface, for example, by a sensor for detecting eddy current to detect the rotation angle of the conveying roller. This embodiment is of the same construction as the first embodiment except for what is described below.

When a high power laser capable of directly forming recesses in the conveying roller cannot be prepared, it is also possible to adopt a method in which a resist is applied to the surface of the roller and the resist film thus formed is partially removed by a laser, providing recesses by etching.

Further, apart from recesses, it is also possible, for example, to write a pattern by varying the gloss or the color of the roller surface, generating a variation in the reflectance of the roller surface and performing detection by a reflectance type sensor.

Fourth Embodiment

Figure 10:
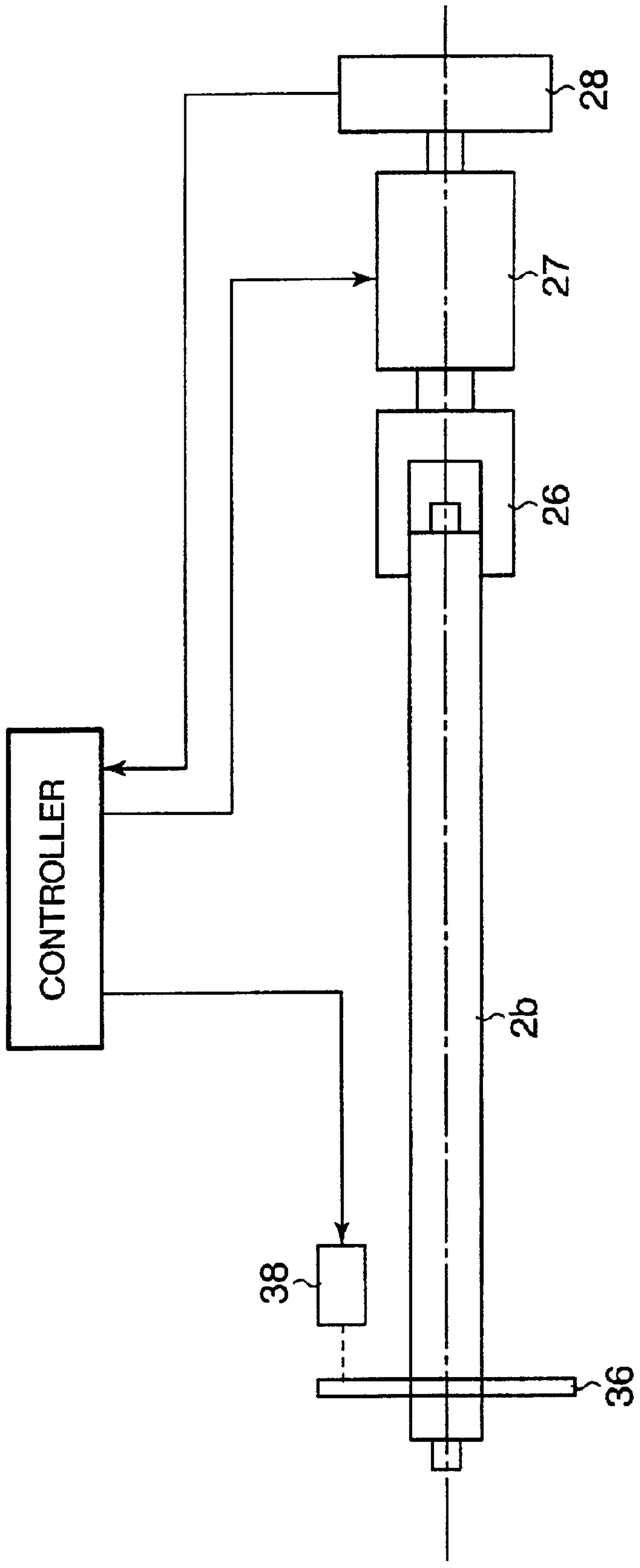
FIG. 10 is a block diagram illustrating a writing device used in a scale producing method according to a fourth embodiment of the present invention.

While in the above-described embodiments angle information is written (formed) on the cylindrical surface of a roller, in this embodiment, angle information is written (formed) on the surface of a wheel 36 having a diameter larger than that of the conveying roller 2*b*, as shown in FIG. 10. This embodiment is of the same construction as the first embodiment except for what is described below.

In this embodiment, it is possible to write angle information on a circumference of a large radius, so that, in comparison with the case in which angle information is written to the roller surface, it is possible to write angle information with higher resolution. That is, when the writing density is the same, it is possible to detect the rotation angle of the conveying roller per pulse more finely when the writing is performed on a circumference of a larger radius.

FIG. 10 is a block diagram showing a writing device according to this embodiment.

The wheel 36 is a thin plate formed of SUS or the like having a thickness of approximately 0.1 to 0.5 mm. After integrating the wheel 36 with the conveying roller 2*b*, the conveyance outer peripheral portion of the conveying roller 2*b* is held and secured by the chuck 26 of the writing device, and the conveying roller 2*b* is rotated by the motor 27.

The rotation angle is detected by the reference encoder 28, and, on the basis of the output of the reference encoder 28, a laser beam is applied by a laser head 38 to effect rotation angle allotment, forming minute holes in the wheel 36.

In this way, rotation angle allotment is effected by means of a laser beam, with the conveyance outer peripheral portion being secured by the chuck 26, so that, if, for example, the wheel 36 is offset with respect to the conveyance outer peripheral portion, perforation is effected so as to effect angle allotment by using the conveyance outer peripheral portion as a reference after integrating the conveying roller 2*b* with the wheel 36. Thus, the rotation angle of the conveyance outer peripheral portion can be detected, and it is possible to perform accurate paper conveyance.

Figure 11:
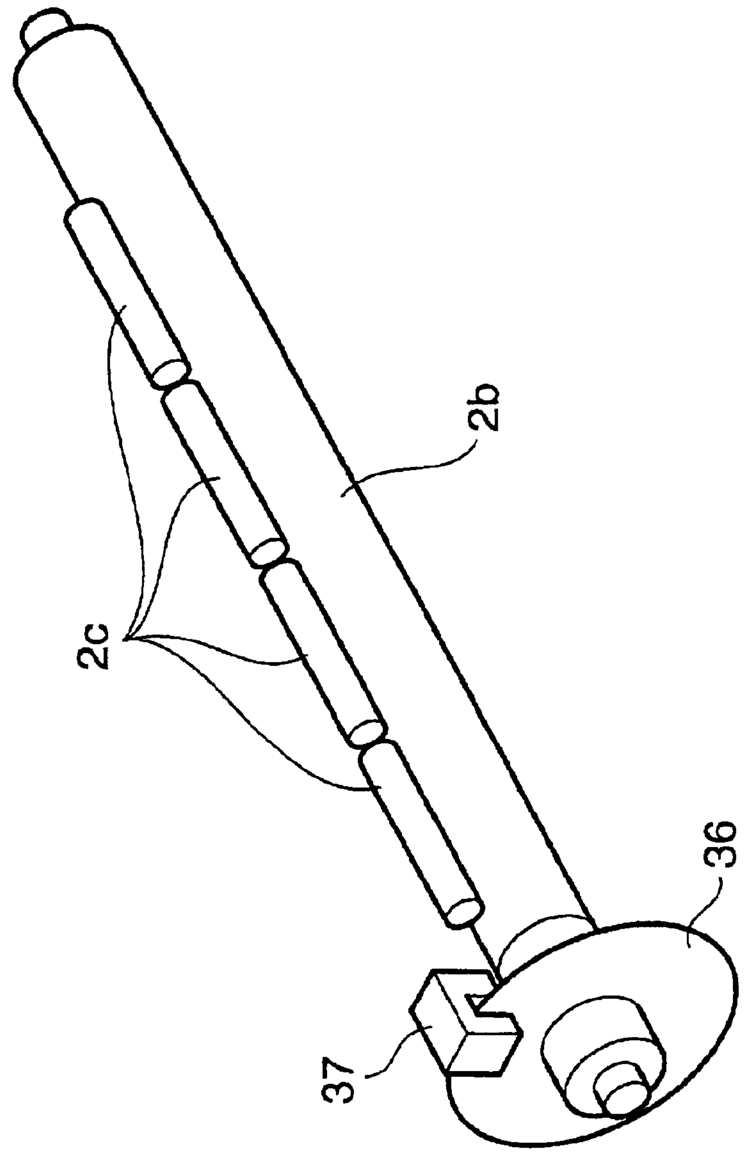
FIG. 11 is a diagram showing a main portion of a conveying-roller-conveyance-rotation-angle detecting means for use in conveyance control of a recording apparatus according to the fourth embodiment.

FIG. 11 is a detailed view showing only the portion related to the LF control of this embodiment. In the drawing, numeral 37 indicates a transmission type photo interrupter element, which is adapted to detect transmission/interruption of infrared light. Since it is an SUS plate, the wheel 36 normally interrupts infrared light. However, the portions perforated by the laser beam of the writing device transmit infrared light, so that it is possible to detect the rotation of the LF roller 2*b*.

It is naturally also possible to apply to the wheel of this embodiment a writing system based on the above-described magnetization system, magneto-optical recording system, reflecting-surface-configuration varying system or the like.

As described in detail with reference to the first through fourth embodiments, the present invention provides a method for producing a conveying roller conveyance angle detecting means for a recording apparatus comprising a conveying means including a conveying roller for conveying a recording medium, and a detecting means for detecting the rotation angle of the conveying roller, wherein, when providing the conveying roller with a scale for detecting conveyance rotation angle, a recording medium conveyance outer peripheral portion of the conveying roller is held, and the scale is formed through rotation angle allotment, whereby it is possible to cancel all the errors, such as mounting offset involved in the method in which the angle detecting scale is mounted to the conveying roller after its formation, making it possible to perform angle detection with high accuracy.

Further, while in the prior art a large diameter detection wheel is provided in order to minimize the influence of the offset error, it is possible, in accordance with the present invention, to minimize the error with a small wheel.

Further, the conveyance angle detecting means can utilize a laser, infrared light, etc.

In particular, the system in which the magnetic detector element and the magnetic scale of the conveying roller are combined with each other allows the magnetization after the integration of the scale with the conveying roller to be conducted relatively easily, and requires no post-processing. Further, if the magnetization should end in failure, demagnetization is easy to effect, so that this system allows reuse, and advantageously leads to a reduction in failure cost, waste, etc.

The present invention further provides a recording apparatus in which the conveyance rotation angle detecting element is provided so as to be of the same phase as the pinch rollers with respect to the axis of the conveying roller conveyance outer peripheral portion, and mounted such that a fixed distance to the recording means is maintained in the sheet conveying direction, whereby it is possible to cancel the offset when the conveying roller is mounted in the recording apparatus.

Further, in the system using a magnetic detector element, the magnetic detector element is elastically biased toward the scale portion of the conveying means, thereby securing a desired detection accuracy.

What is claimed is:

1. A method for producing a scale for detecting a conveyance rotation angle of a conveying roller provided in an ink-jet recording apparatus adapted to perform recording on a recording medium conveyed while being held between the conveying roller and a driven roller by using recording means, which forms an image on the recording medium by discharging ink onto the recording medium, the method comprising the steps of:

integrating the conveying roller with a conveyance angle detection pattern writing member coaxially mounted with the conveying roller; and holding a recording medium conveyance outer peripheral portion of the conveying roller integrated with the conveyance angle detection pattern writing member, and performing rotation angle allotment on the conveyance angle detection pattern writing member to form a scale for detecting the conveyance rotation angle.

2. A method according to claim 1, wherein the scale is a magnetic scale formed by magnetically performing conveyance angle allotment.

3. A method according to claim 1 or 2, wherein the ink-jet recording apparatus is provided with an electrothermal converter for generating energy for discharging the ink.

4. A method according to claim 1 or 2, wherein the writing member is integrally provided with a conveying roller drive transmitting means.

5. A method according to claim 1 or 2, wherein, in the recording apparatus, a detecting device for detecting angle information provided on the scale is provided so as to be of the same phase as the driven roller with respect to the axis of the conveyance outer peripheral portion of the conveying roller.

6. A method according to claim 1 or 2, wherein, in the recording apparatus, a detecting device for detecting angle information provided on the scale is elastically biased against the scale and arranged so as to be at a fixed distance from the recording means with respect to the recording medium conveying direction.

7. An ink-jet recording apparatus comprising conveying means having a conveying roller and a pinch roller in close contact with said conveying roller, and detecting means for detecting a rotational angle of said conveying means, wherein a recording medium conveyed by said conveying means is recorded by recording means for discharging ink on the recording medium to form an image, said recording apparatus being manufactured by the steps of:

integrating the conveying roller with a conveyance angle detection pattern writing member coaxially mounted with the conveying roller; and holding a recording medium conveyance outer peripheral portion of the conveying roller integrated with the conveyance angle detection pattern writing member, and performing rotation angle allotment on the conveyance angle detection pattern writing member to form a scale for detecting the conveyance rotation angle.

8. A recording apparatus according to claim 7, wherein said detecting means is biased to a magnetic scale of said conveying means to maintain a distance to said conveying means constant.

9. A recording apparatus according to claim 7 or 8, wherein said recording means comprises an electrothermal converting member for generating energy utilized to discharge the ink.

10. A method for producing a scale for detecting a conveyance rotation angle of a conveying roller provided in a recording apparatus adapted to perform recording on a recording medium conveyed while being held between the conveying roller and a pinch roller by using recording means which forms an image on the recording medium by discharging ink on the recording medium, the method comprising the steps of:

integrating the conveying roller with a scale member coaxially mounted with the conveying roller; and holding an outer peripheral portion of the conveying roller integrated with the scale member, and performing rotation angle allotment on the scale member to form a scale for detecting the conveyance rotation angle.

* * * * *